Nov. 10, 1953 T. W. JOHNSON 2,658,331
RAM-JET LAUNCHING SEQUENCE FUEL FLOW CONTROL VALVE
Filed Feb. 16, 1950 3 Sheets-Sheet 3

INVENTOR.
THOMAS W. JOHNSON
BY Michael J. Borsella
ATTORNEY

Patented Nov. 10, 1953

2,658,331

UNITED STATES PATENT OFFICE 2,658,331

RAM-JET LAUNCHING SEQUENCE FUEL FLOW CONTROL VALVE

Thomas W. Johnson, Troy Hills, N. J., assignor to Bendix Aviation Corporation, Teterboro, N. J., a corporation of Delaware Application February 16, 1950, Serial No. 144,504

9 Claims. (Cl. 60—35.6)

1

The present invention relates to sequence flow valves and particularly to a type adapted for the fuel system of a ram jet engine.

A ram jet propelled aircraft cannot take off under its own power. A ram jet propelled aircraft needs to be launched from a platform, roller, or other suitable device, and it has been known in the art to employ rocket boosters or the like attached in the exhaust cone of the ram jet engine in the launching operation. In such installations, the flow of air through the combustion pipe of the ram jet is restricted due to the presence of the booster therein so that it is necessary for the duration of said condition that less than the normal amount of fuel be supplied to the combustion chamber of the engine in order that the proper air-fuel mixture ratio be maintained. After the ram jet propelled aircraft has been launched and has accelerated sufficiently to sustain itself by its own thrust thereafter, the booster mechanism is released or dropped from the exhaust cone, thereby suddenly increasing by a substantial amount the flow passage of air through the combustion pipe.

The present invention contemplates the provision of fuel control means incorporating a sequence fuel flow control valve whereby the air fuel ratio in the ram jet combustion chamber will be maintained at a substantially constant combustible ratio during the launching operation and thereafter. The air fuel ratio in a ram jet engine is combustible only within relatively narrow limits, and the present invention provides means for maintaining the ratio within said limits at all times.

It is, therefore, one of the objects of the present invention to provide fuel flow control means for a ram jet engine wherein the foregoing problem is eliminated and to do so in a novel and effective manner.

Another object of the invention is to provide a launching sequence fuel flow control valve for a ram jet engine which will by-pass some of the fuel back to the fuel reservoir during the early phases of the launching operation.

Still another object of the invention is to provide means for controlling the supply of fuel from a reservoir to the combustion chamber of a ram jet propelled aircraft launched by means of a booster rocket.

Still another object of the invention is to provide a sequential operating fuel valve for a ram jet engine, operable to provide a constantly combustible air fuel ratio during and after launching of the craft.

Another object of the invention is to provide

2 fuel flow control means of the above indicated character operable at constant delivery of the fuel pump despite combustion chamber demand changes.

Still another object of the invention is to provide fuel system control means whereby variations in pressure are sensed to control the speed of the fuel pump so as to maintain a constant flow.

Still a further object of the invention is to provide a fuel flow control valve which will embody a minimum of moving parts.

Another object of the invention is to provide a valve of the above indicated character which will be facile and economical to manufacture, and yet positive and reliable in operation.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for the purpose of illustration only and is not to be construed as defining the limits of the invention.

In the drawings, wherein like reference characters designate like parts,

Figure 2:
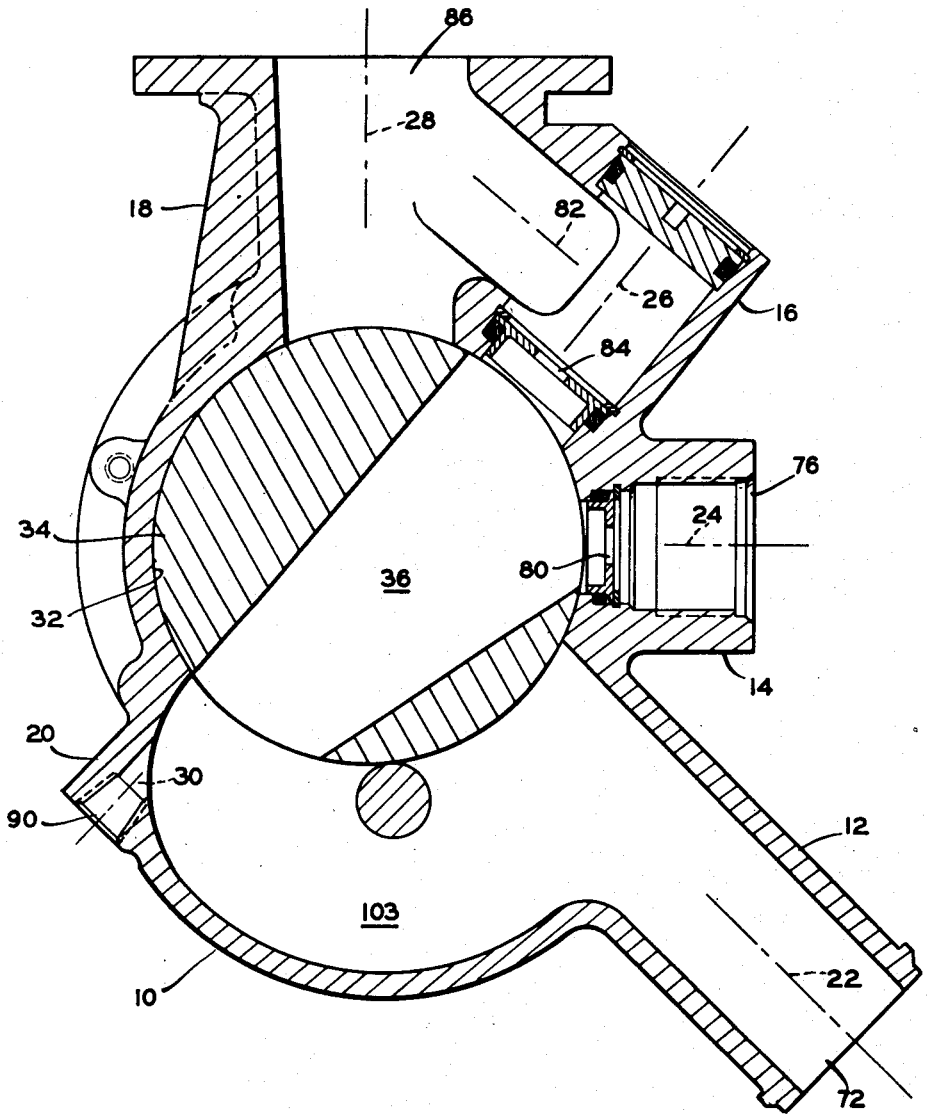
Figure 2 is a vertical section of the launching sequence fuel flow control valve showing the rotary member in the booster assisted launching position.

Referring now to the drawings and more particularly to Figure 2, the control valve therein illustrated comprises a hollow casing 10 containing a plurality of bosses 12, 14, 16, 18 and 20, each containing passages 22, 24, 26, 28 and 30, respectively, all leading radially towards an annular center chamber 32 in the casing 10. The chamber 32 contains a cylindrical revolving valve member 34 which substantially fills the chamber 32, and the valve member 34 contains a through frustrum shaped passage 36 adapted to complete communication between various of the radial passages 22, 24, 26, 28 and 30 depending upon the rotary position of the valve member 34 in the chamber 32 as hereinafter explained.

Figure 3:
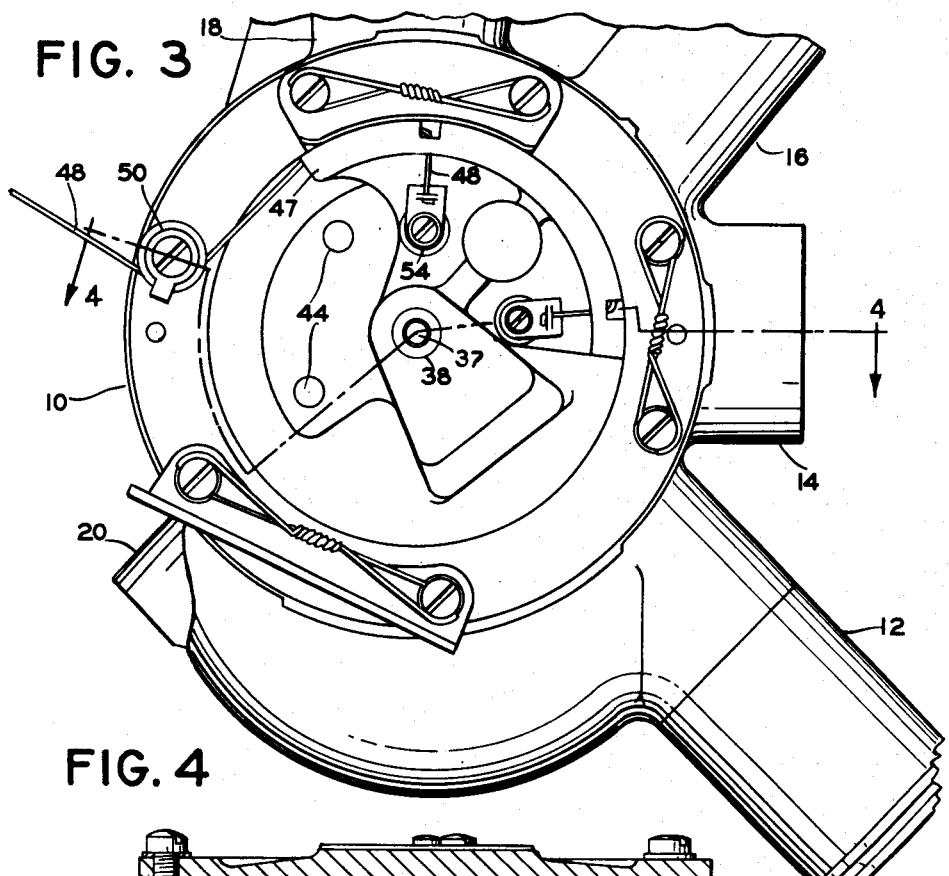
Figure 3 is a plan view of the valve.
Figure 4:
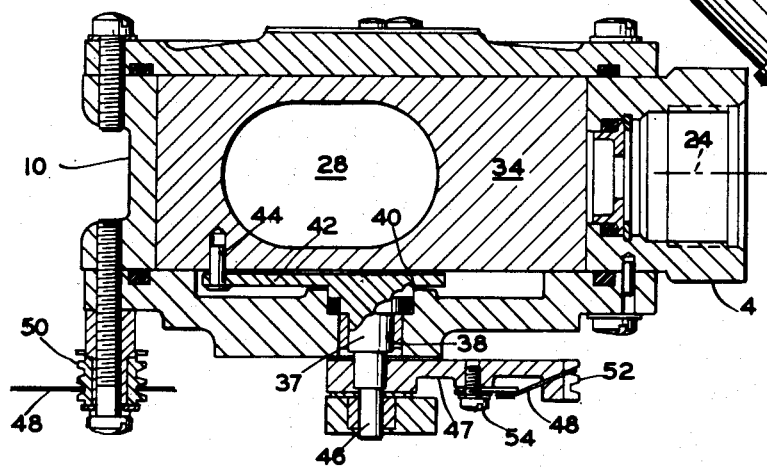
Figure 4 is a view along the line 4—4 of Figure 3.

Referring now to Figures 3 and 4, a shaft 37 free to revolve in the bore 38 of the casing 10 attaches on the inner end 40 to a diamond shaped lever 42 which in turn is attached to the rotary valve member 34 by means of pins 44 so that turning the shaft 37 will affect a turning of the valve member 34. The outer end 46 of the shaft 37 is attached to a tiller 47 which is in turn positioned by a frangible wire 48 which is guided over a roller 50 to the grooves 52 in the tiller 46 and attaches by some suitable means, as to a post 54 thereon, so that pulling the cable 48 will affect a turning of the shaft 37 and therefore of the valve member 34.

Figure 1:
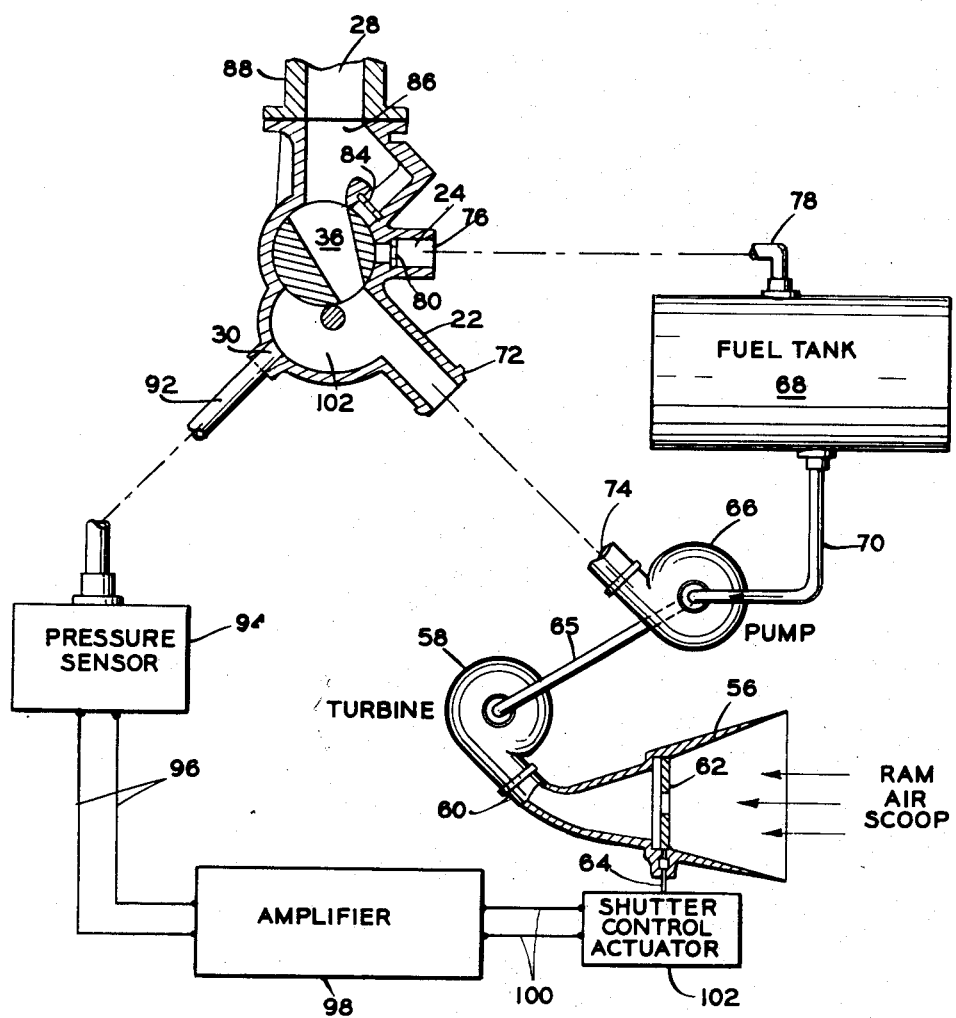
Figure 1 is a schematic diagram of the fuel system in a ram jet engine.

Referring now to Figures 1 and 2, a ram air scoop 56 leads to an air turbine 58 by means of nozzles 60. A series of shutters 62 actuated by a rod 64 are adapted to throttle the flow of air through the scoop 56 to the turbine 58, and thereby govern the speed of the turbine, and since the turbine is connected by means of drive shaft 65 to a fuel pump 66, the speed of the pump 66 is thereby governed.

The pump 66 connects to a fuel reservoir 68 by means of conduit 70, and to the passageway 22 at an inlet 72 in the boss 12 by means of a conduit 74. An outlet 76 in the boss 14 connects the passageway 24 to the fuel tank 68 by means of a by-pass return conduit 78. The passageway 24 contains an orifice 80 which regulates the fluid flow from the valve chamber 32.

The passageway 26 is sealed at the end thereof by the boss 16, but intersects an intermediate passageway 82 which leads from passageway 26 to passageway 28. An orifice 84 meters the fluid flow between the valve chamber 32 and the passageway 26.

The passageway 28 connects at outlet 86 of the boss 18 to a conduit 88 which leads to the combustion chamber, not shown here, of the jet engine.

The passageway 30 is connected at outlet 90 of boss 20 to a conduit 92 which leads to a pressure sensor 94 of the type well known in the art and adapted to transmit the fuel pressure supplied by the pump 66 to the passageway 22 into an electrical signal. The pressure sensor 94 is connected by means of wire conductors 96 to an amplifier 98 of a type well known in the art, and adapted to amplify the electric signal from the sensor 94. The amplifier 98 is connected by means of wire conductors 100 to a shutter control actuator or reversible electric motor 102 which actuates and governs the movement of the shutter control shaft 64, and the output from the amplifier 98 controls the shutter actuator 102. The pressure sensor 94, electrical control system, amplifier 98 and actuator motor 102 may be of a suitable type well known in the art such as shown, for example, in application Serial No. 40,918, filed July 27, 1948, by William R. Polye and James E. Bevins.

The sequence fuel flow control valve is set as shown in Figure 2 upon launching of the ram jet so that the passage 36 in the rotary valve member 34 connects the fuel inlet port 72 and passageway 22 by means of a channel 103, with the by-pass port 76 and the passageway 26. It is to be noted that the passageway 20 and the pressure port passageway 30 are connected at all times by the channel 103, irrespective of the position of the rotary valve member 34.

Figure 5:
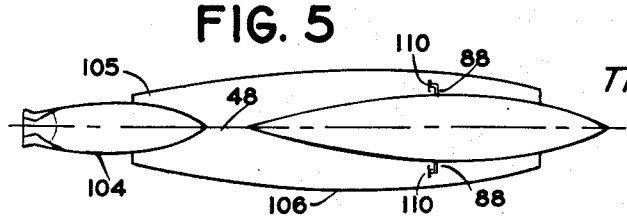
Figure 5 is a schematic view illustrating a ram jet engine with a detachable-droppable rocket booster.

With the sequence valve member 34 in the position of Figure 2, the frangible wire cable 48 is made taut and the opposite free end thereof is secured to an automatically detachable booster indicated in Figure 5 by the numeral 104.

The rocket booster 104, of liquid or solid propellant type, is partially inserted in the exhaust cone 105 of the ram jet propelled aircraft 106.

This rocket booster 104 restricts the flow of air from exhaust cone 105. Upon, or just prior to firing the booster 104, the wire 48 is pulled to move the tiller 47, and valve member 34 to a position opening passages 24 and 26 to passage 36 as shown in Figure 2. Upon the booster 104 firing, the ram-jet propelled aircraft 106 accelerates under the thrust from the booster 104, and ram air is taken in by the scoop 56 which is exposed to the air stream. This entrapped air is metered through a shutter 62 and a nozzle 60 to drive the air turbine 58.

The pump 66 is gradually accelerated to a speed which passes fuel adequate to sustain the engine in flight without the booster 104. However, because the booster 104 is positioned in the exhaust cone 105 of the ram jet engine, it restricts the passage of air through the combustion chamber and that, in turn, requires that less than the normal amount of fuel be supplied to the combustion chamber in order that a combustible air-fuel mixture ratio be maintained. It is considered desirable that the pump 66 run at constant speed to effect a constant fuel flow rate which is accomplished through the fuel pressure sensor 94, amplifier 98, and shutter control 102 to regulate the shutters 62 and thereby the driven speed of the pump 66 to maintain a constant output pump pressure. However, during the operation of the booster 104 restricting the air flow through the combustion chamber, a percentage of the pumped fuel is by-passed and returned to the fuel tank 68 to maintain a combustible air fuel ratio. Metering orifice 80 in the by-pass passage 24 permits a proper proportion of fuel to be returned to the fuel tank 68 while metering orifice 84 in the outlet passage 26 passes the remainder of the fuel to the combustion chamber through conduit 88 and out fuel nozzles 110 shown schematically in Figure 5.

With the rotary valve member in the position shown in Figure 2, the fuel entering the inlet port 72 will flow along passageways 22, 103 and 36 at the end of which the proper proportion of the fuel will enter the metering orifice 84 and pass through passages 82 and 26 to the combustion chamber of the ram jet. The remainder of the fuel will pass through the metering orifice 80, and thence into passageway 24 where it will return to the fuel tank 68 through the by-pass return conduit 78. The metering orifices 80 and 84 are set so that proper proportions of the fuel are passed to the combustion chamber and returned to the fuel tank 68.

As the ram jet accelerates in response to the thrust from the booster, ram air is taken in the scoop 56 which is exposed to the air stream. The air so entrapped is metered through the shutter 62 and passed onto the nozzle 60 to drive the air turbine 58 and the pump 66 by means of the interconnecting shaft 65. The pump 66 is thereby gradually accelerated to a speed which passes fuel in adequate quantity to sustain the ram jet in flight without the booster.

When the booster 104 is exhausted and drops out of the exhaust cone of the ram jet, a pulling force will be exerted on the wire 48 by the booster 104 which in turn will react on the tiller 46 to rotate the shaft 37 and thereby the lever 42 to turn the rotary valve member 34 to the position shown in Figure 1. At the limit of movement of the valve member 34 the frangible wire 48 will in turn break freeing the booster 104 from the aircraft.

In said position as shown in Figure 1, it will be noted that the fuel inlet port 72 and passageway 22 are connected directly to passageway 28 by means of the through passage 36 in the valve member 34 and the by-pass port 76 and the passageway 26 are closed so that all of the output from the fuel pump 66 goes directly to the combustion chamber by way of the passageway 28 and outlet port 86 so as to effect through operation of pressure sensor 94, amplifier 98 and shutter control 102 a proper air fuel ratio in the combustion chamber with the booster 104 removed.

When booster 104 is exhausted and drops out of the exhaust cone 105 of the ram jet after having accelerated it to the velocity desired, the full air supply will then pass through the unrestricted exhaust cone 105 and the full capacity of the pump is utilized to maintain a constantly combustible air fuel ratio.

The pump pressure transmitted through port 90 to the pressure sensor 94 is thus transmitted into an electrical signal and passed into amplifier 98 to control the shutter control motor 102 which actuates the control rod 64 to govern the position of the shutters 62 and thereby the quantity of ram air passing from the scoop 56 to the nozzle 60, so that the speed of the turbine 58 and of the pump 66 will be regulated, and ultimately thereby the quantity of fuel pumped through the sequence valve to the combustion chamber.

The fuel flow regulation is accomplished so that when the pump pressure drops, the pressure sensor 94 supplies an electrical signal to the amplifier 98 to cause the shutter control motor 102 and shaft 64 to open the shutters 62 thereby admitting more ram air to the nozzle 60 to increase the turbine 58 and pump 66 velocity and thereby increase the fuel supply.

Conversely when the fuel pressure is excessive, the pressure sensor will supply a signal to the amplifier so that the shutter control motor 102 will now actuate the shaft 64 in a direction to close the shutters 62 thereby slowing down the air driven turbine 58 and pump 66 to diminish the fuel supply.

There are thus provided reliable and positive fuel flow control means for a ram jet engine which will maintain a constantly combustible air fuel ratio throughout a booster assisted launching and thereafter.

A novel feature of the invention is the provision of a sequential operating valve in a booster assisted ram jet engine together with means operable to provide a constantly combustible air fuel ratio irrespective of whether or not the booster unit is in place. Provision is also made for running the pump at constant delivery speed, so that, in conjunction with the sequential operation of the valve, no change in delivered output of the pump may be effected as combustion chamber demands change.

Although only one embodiment and one application of the drawing has been illustrated and described, other changes and modifications in the form and relative arrangement of parts, which will be apparent to those skilled in the art, may be made without departing from the spirit and scope of the invention.

What is claimed is:

1. A sequential flow control valve for use in the fuel system of a ram jet engine having a booster releasably secured thereto, comprising a casing including a cylindrical chamber therein, a rotary valve member including a through bore in said chamber, a shaft protruding through said casing, a lever on the inner end of said shaft pinned to said valve member, a tiller on the opposite end of said shaft, cable means attaching said tiller to the booster, a fuel inlet and a main fuel outlet opening into said chamber, a by-pass port and a second fuel outlet port opening into said chamber, a metering orifice in both said by-pass port and a second fuel outlet port, said second outlet port opening into said main outlet port beyond said orifice, said rotary valve member normally operative to connect said fuel inlet through said bore to said by-pass port and second fuel outlet, and said cable means and tiller operated by the booster on its release to turn said shaft and lever, affecting said valve member so as to cause said bore to connect said fuel inlet directly to said main fuel outlet.

2. A sequential flow control valve for use in the fuel system of a ram jet engine having a booster releasably secured thereto, comprising a casing including a cylindrical chamber therein, a fuel inlet and a main fuel outlet connected to said chamber, a by-pass port and a secondary fuel outlet connected to said chamber, a metering orifice in both said by-pass port and secondary fuel outlet, said secondary fuel outlet connected to said main fuel outlet beyond said orifice, a rotary valve member including a bore therethrough in said chamber, said bore normally connecting said fuel inlet to said orifice metering by-pass and secondary fuel outlet, means for connecting said rotary valve member to the booster whereby the release of the booster moves said rotary valve member and bore to connect said fuel inlet to said main fuel outlet, and a pressure port connected to said fuel inlet for sensing the fuel pressure therein.

3. A valve for controlling the quantity of fuel flow in the fuel system of a ram jet engine having a booster releasably secured thereto assisting the launching of a ram jet propelled aircraft, comprising a cylindrical casing including a valve chamber, a fuel inlet and a main fuel outlet connected to said chamber, a by-pass port and a second fuel outlet connected to said chamber, metering orifice means separating said chamber from said by-pass port and second fuel outlet, said second fuel outlet connected to said main fuel outlet beyond said orifice, a rotary valve member including a bore therethrough in said chamber, said bore connecting said fuel inlet simultaneously to said by-pass and second fuel outlet, and means adapted for connection to the booster for actuating said rotary valve member so as to connect said fuel inlet to said main fuel outlet directly through the bore of said rotary valve member upon the release of the booster.

4. For use in a ram jet aircraft engine, in combination, a ram air scoop, a series of shutters controlling the air flow through said scoop, control means attached to actuate said shutters, an air turbine connected to said scoop, a fuel pump driven by said turbine, a fuel reservoir connected to the inlet of said pump, flow control means including a cylindrical casing, a chamber in said casing, an inlet port and a main outlet port communicating with said chamber, said inlet port connected to said fuel pump outlet, a by-pass port and a second fuel outlet communicating with said chamber, metering orifice means separating said chamber from said by-pass port and second fuel outlet, said second fuel outlet connected to said main fuel outlet beyond said orifice, said by-pass port leading to said fuel reservoir, a rotary valve member in said chamber, said valve member connecting said fuel inlet simultaneously to said by-pass port and second fuel outlet, a booster releasably secured to the engine, means actuated by said booster to affect said rotary valve so as to connect said main fuel inlet directly through said valve member to said fuel outlet upon release of said booster from the aircraft.

5. In an aircraft having a ram jet engine including a combustion chamber, and a booster rocket releasably secured to said engine to assist in launching the aircraft the combination with said combustion chamber and booster rocket of valve means controlling the quantity of fuel supplied to the combustion chamber, means operatively connecting said booster rocket to said valve means whereby said valve is actuated through said operating means to increase the flow of fuel to the combustion chamber upon the exhaustion of said booster rocket, and regulating means responsive to fuel flow through said valve means for maintaining a constant combustible air-fuel ratio for the combustion chamber during launching of said aircraft.

6. In an aircraft having a ram jet engine including a combustion chamber, and a booster rocket releasably secured to said engine to assist the launching of said aircraft, the combination with said combustion chamber and booster of valve means controlling the quantity of fuel supplied to the combustion chamber, frangible means operatively connecting said booster rocket to said valve means whereby said valve is actuated through said operating means to increase the flow of fuel to the combustion chamber upon the release of said booster rocket, and regulating means responsive to fuel flow through said valve means for maintaining a constant combustible air-fuel ratio for the combustion chamber during launching of said aircraft and flight after the release of said booster rocket.

7. In an aircraft having a ram jet engine, a fuel supply system for said engine and a booster releasably secured to said engine to assist the take-off of said aircraft, the combination with said fuel supply system and said booster of a sequential flow control valve for regulating fuel flow through said fuel system to said engine, said valve comprising a casing including a cylindrical chamber therein, a rotary valve member including a through bore in said chamber, a shaft protruding through said casing, a lever on the inner end of said shaft pinned to said valve member, a tiller on the opposite end of said shaft, cable means attaching said tiller to said booster, a fuel inlet and a main fuel outlet opening into said chamber, a by-pass port and a second fuel outlet port opening into said chamber, a metering orifice in both said by-pass port and a second fuel outlet port, said second outlet port opening into said main outlet port beyond said orifice, said rotary valve member normally operative to connect said fuel inlet through said bore to said by-pass port and second fuel outlet upon operation of said booster, and said cable means and tiller effective by the release of said booster to turn said shaft and lever, affecting said valve member so as to cause said bore to connect said fuel inlet directly to said main fuel outlet.

8. In an aircraft having a ram jet engine including, a fuel supply system and a booster releasably secured to said engine to assist the take-off of said aircraft, the combination with said fuel supply system and said booster of a sequential flow control valve for regulating fuel flow through said fuel system to said engine, said valve comprising a casing including a cylindrical chamber therein, a fuel inlet and a main fuel outlet connected to said chamber, a by-pass port and a secondary fuel outlet connected to said chamber, a metering orifice in both said by-pass port and secondary fuel outlet, said secondary fuel outlet connected to said main fuel outlet beyond said orifice, a rotary valve member including a bore therethrough in said chamber, said bore normally connecting said fuel inlet to said orifice metered by-pass and secondary fuel outlet upon operation of said booster, and means connecting said rotary valve member to said booster whereby said valve member is moved and said bore connects said fuel inlet to said main fuel outlet upon the release of said booster, and a pressure port connected to said fuel inlet for sensing the fuel pressure therein.

9. In an aircraft having a ram jet engine including a fuel supply system and a booster releasably secured to said engine to assist the take-off of said aircraft, the combination with said fuel supply system and said booster of a sequential flow control valve for regulating fuel flow through said fuel system to said engine, said valve comprising a cylindrical casing including a valve chamber, a fuel inlet and a main fuel outlet connected to said chamber, a by-pass port and a second fuel outlet connected to said chamber, metering orifice means separating said chamber from said by-pass port and second fuel outlet, said second fuel outlet connected to said main fuel outlet beyond said orifice, a rotary valve member including a bore therethrough in said chamber, said bore connecting said fuel inlet simultaneously to said by-pass and second fuel outlet, and means connected to and actuated by the release of said booster for actuating said rotary valve member so as to connect said fuel inlet to said main fuel outlet directly through the bore of said rotary valve member.

THOMAS W. JOHNSON.

References Cited in the file of this patent

UNITED STATES PATENTS

| Number | Name | Date |
|---|---|---|
| 487,065 | Cooper | Nov. 29, 1892 |
| 1,815,097 | Davidson | July 21, 1931 |
| 2,335,085 | Roberts | Nov. 23, 1943 |
| 2,351,750 | Fawkes | June 20, 1944 |

FOREIGN PATENTS

| Number | Country | Date |
|---|---|---|
| 578,311 | Great Britain | June 24, 1946 |
| 585,564 | Great Britain | Feb. 11, 1947 |